US011532123B2

(12) United States Patent
Wang et al.

(10) Patent No.: US 11,532,123 B2
(45) Date of Patent: Dec. 20, 2022

(54) METHOD FOR VISUALIZING LARGE-SCALE POINT CLOUD BASED ON NORMAL

(71) Applicant: Nanjing University of Aeronautics and Astronautics, Nanjing (CN)

(72) Inventors: Jun Wang, Nanjing (CN); Zikuan Li, Nanjing (CN); Anyi Huang, Nanjing (CN); Qian Xie, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/574,796

(22) Filed: Jan. 13, 2022

(65) Prior Publication Data

US 2022/0198748 A1 Jun. 23, 2022

(30) Foreign Application Priority Data

Jan. 18, 2021 (CN) .......................... 202110061813.1

(51) Int. Cl.
*G06T 17/00* (2006.01)

(52) U.S. Cl.
CPC ........ *G06T 17/005* (2013.01); *G06T 2210/36* (2013.01); *G06T 2210/56* (2013.01)

(58) Field of Classification Search
None
See application file for complete search history.

(56) References Cited

U.S. PATENT DOCUMENTS

| 6,580,425 B1* | 6/2003 | Zwicker ............... G06T 15/205 |
| | | 345/420 |
| 9,245,382 B2* | 1/2016 | Zhou ..................... G06T 17/005 |
| 11,010,928 B2* | 5/2021 | Mammou ................ G06T 9/00 |
| 11,158,107 B2* | 10/2021 | Hur ....................... G06T 19/003 |

(Continued)

FOREIGN PATENT DOCUMENTS

| CN | 109325993 A | 2/2019 |
| CN | 109544681 A | 3/2019 |

(Continued)

OTHER PUBLICATIONS

Zhu,Li et al. A Fast Rendering Method for 3D City Building Point Cloud Models,"Journal of Computer-Aided Design & Computer Graphics",2015, vol. 27 (No. 8), 1442-1450.

(Continued)

*Primary Examiner* — Anand P Bhatnagar
(74) *Attorney, Agent, or Firm* — Wayne IP LLC

(57) ABSTRACT

A method for visualizing a large-scale point cloud based on normal, including: (S1) according to a spatial structure of a point cloud data, constructing a balanced octree structure of a node point cloud; (S2) according to the balanced octree structure and normal information of a point cloud, constructing an octree structure with the normal information; and constructing a normal level-of-detail (LOD) visualization node through downsampling; and (S3) determining a node scheduling strategy according to a relationship between a viewpoint, a viewing frustum and a normal of a render node; and respectively calling a reading thread and a rendering thread to simultaneously perform reading and rendering according to the node scheduling strategy.

6 Claims, 1 Drawing Sheet

(56) References Cited

U.S. PATENT DOCUMENTS

| | | | |
|---|---|---|---|
| 11,257,199 B2* | 2/2022 | Ponto | G06T 11/203 |
| 11,282,239 B2* | 3/2022 | Han | G06T 9/40 |
| 2010/0085353 A1* | 4/2010 | Zhou | G06T 17/00 |
| | | | 345/419 |
| 2020/0258202 A1* | 8/2020 | Cai | G06T 5/005 |
| 2021/0103780 A1* | 4/2021 | Mammou | G06T 11/20 |
| 2021/0209812 A1* | 7/2021 | Han | H04N 19/64 |
| 2021/0264640 A1* | 8/2021 | Mammou | G06T 7/50 |
| 2022/0028161 A1* | 1/2022 | Lawrence | G06T 17/005 |
| 2022/0245895 A1* | 8/2022 | Meeussen | G06T 17/05 |

FOREIGN PATENT DOCUMENTS

| | | |
|---|---|---|
| CN | 110689611 A | 1/2020 |
| CN | 111552555 A | 8/2020 |

OTHER PUBLICATIONS

Wang,Jun et al. A variational model for normal computation of point clouds. "Visual Computer". 2012, vol. 28 (No. 2), 163-174.

* cited by examiner

METHOD FOR VISUALIZING LARGE-SCALE POINT CLOUD BASED ON NORMAL

CROSS-REFERENCE TO RELATED APPLICATIONS

This application claims the benefit of priority from Chinese Patent Application No. 202110061813.1, filed on Jan. 18, 2021. The content of the aforementioned application, including any intervening amendments thereto, is incorporated herein by reference in its entirety.

TECHNICAL FIELD

This application relates to three-dimensional data visualization, and more particularly to a method for visualizing a large-scale point cloud based on normal.

BACKGROUND

In recent years, lidar and three-dimensional (3D) scanning technologies have been widely used in surveying and mapping, power line inspection, construction of digital city, protection of ancient buildings, military equipment measurement and digital twins. By virtue of the 3D scanning technology, massive 3D point cloud data, which usually reaches the scale of hundreds of millions and includes reflection intensity and normal direction as well as coordinates of data points, can be quickly acquired. However, how to effectively store and visualize large-scale point clouds has still been unsolved.

The storage and visualization of the large-scale point cloud will consume a lot of computer resources, so the organization, management and display of the large-scale point cloud will directly affect the visualization effect of the point cloud data. Among the recent point cloud visualizing methods, the partitioned index is used to solve the problem that point clouds cannot be completely read into memory. However, for those structurally-complex point clouds, invalid rendering such as point cloud occlusion and point cloud on the back of the scene still occurs in the process of tile rendering, which causes serious waste of computer rendering resources, especially for the large-scale point cloud data.

SUMMARY

An object of the present disclosure is to provide a method for visualizing a large-scale point cloud based on normal to overcome the defects of invalid rendering for occluded point clouds and resource waste in the existing large-scale point cloud visualization.

The technical solutions of the present disclosure are described as follows. A method for visualizing a large-scale point cloud based on normal, the method comprising:

(S1) according to a spatial structure of a point cloud data, constructing a balanced octree structure of a node point cloud;

(S2) according to the balanced octree structure and normal information of a point cloud, constructing an octree structure with the normal information; and constructing a normal level-of-detail (LOD) visualization node through downsampling; and (S3) determining a node scheduling strategy according to a relationship between a viewpoint, a viewing frustum and a normal of a render node; and respectively calling a reading thread and a rendering thread to simultaneously perform reading and rendering according to the node scheduling strategy.

In some embodiments, the step (S1) is performed through steps of:

(S101) setting a maximum bounding box as a root node of an octree according to a range of the point cloud; setting a level of the octree according to the number of points of the point cloud; generating an octree structure from the root node to a set level; and allocating the point cloud data to a child node at a lowest level; and (S102) setting a threshold $\varepsilon$ of the number of points of the child node at the lowest level; and performing balance adjustment on the octree, such that the number of point clouds allocated to each node is less than the threshold $\varepsilon$ and the number of parent nodes of each node is larger than the threshold $\varepsilon$.

In some embodiments, the step (S102) is performed through steps of:

(S102-1) marking all child nodes at the lowest level that have been allocated with a point cloud as first nodes to be adjusted; and adding the nodes to be adjusted into a node sequence to be adjusted;

(S102-2) traversing all node sequences to be adjusted, if the number of points of a node is greater than or equal to the threshold $\varepsilon$, generating eight nodes in next level, allocating a point cloud of the node to the next level, marking the eight nodes newly generated as second nodes to be adjusted, and adding the second nodes to be adjusted into the node sequence to be adjusted; and if the number of points of the node is less than the threshold $\varepsilon$, determining whether the total number of points of eight child nodes included in a parent node of the node of the node is greater than the threshold $\varepsilon$, if the total number of points of eight child nodes included in the parent node of the node is greater than or equal to the threshold $\varepsilon$, marking the node as an adjusted node; if the total number of points of eight child nodes included in the parent node of the node is less than the threshold $\varepsilon$, deleting the eight child nodes and allocating point clouds of the eight child nodes to the parent node of the node, marking the parent node of the node as a node to be adjusted followed by adding into the node sequence to be adjusted; and (S102-3) if there are still nodes to be adjusted in the octree structure, repeating the step (S102-2) until all nodes are marked as adjusted node.

In some embodiments, the step (S2) is performed through steps of:

(S201) calculating an average normal of all points of a child node at the lowest level as a normal of the node; and taking a ratio of the number of points of the node to the number of all points of the point cloud as a normal weight of the node; and (S202) downsampling point cloud data of the child node from bottom to top; putting a downsampled point cloud of the child node into a corresponding parent node at an upper level; calculating a normal and a normal weight of the parent node according to a normal and a normal weight of the child node; according to such rule, operating level by level until the root node is reached to obtain all normal LOD visualization nodes.

In some embodiments, the step (S3) is performed through steps of:

(S301) determining a LOD node queue that needs to be visualized according to the relationship between the viewpoint, the viewing frustum and the normal of the render node; and (S302) reading the LOD node queue using the reading thread followed by rendering using the rendering thread.

In some embodiments, the step (S301) is performed through steps of:

defining a line-of-sight direction as $\vec{s}$ and a closest distance from the viewpoint to the point cloud as d, and defining that each node has a normal direction $M_{ni}$; determining the number of levels needed to be displayed according to the d; determining a node to be displayed at the level to be displayed according to the viewing frustum; and determining the LOD node queue that needs to be visualized according to $\vec{s} \cdot M_{ni} < 0$.

The beneficial effects of the present disclosure are described as follows.

The existing large-scale point cloud rendering process generally involves invalid rendering of a large number of occluded point clouds. In the method provided herein, the points that need to be rendered in the current viewing angle are screened out based on the normal of the point cloud, so as to effectively remove the redundant rendering of the occluded point cloud and the point cloud on the back of the scene, reducing the number of points actually rendered in the point cloud and enhancing the reality of the visualization the point cloud. Therefore, the method is beneficial to the real-time and efficient visualization of the large-scale point cloud.

DETAILED DESCRIPTION OF EMBODIMENTS

This application will be described in detail below with reference to the accompany drawings and the embodiments.

Figure 1:
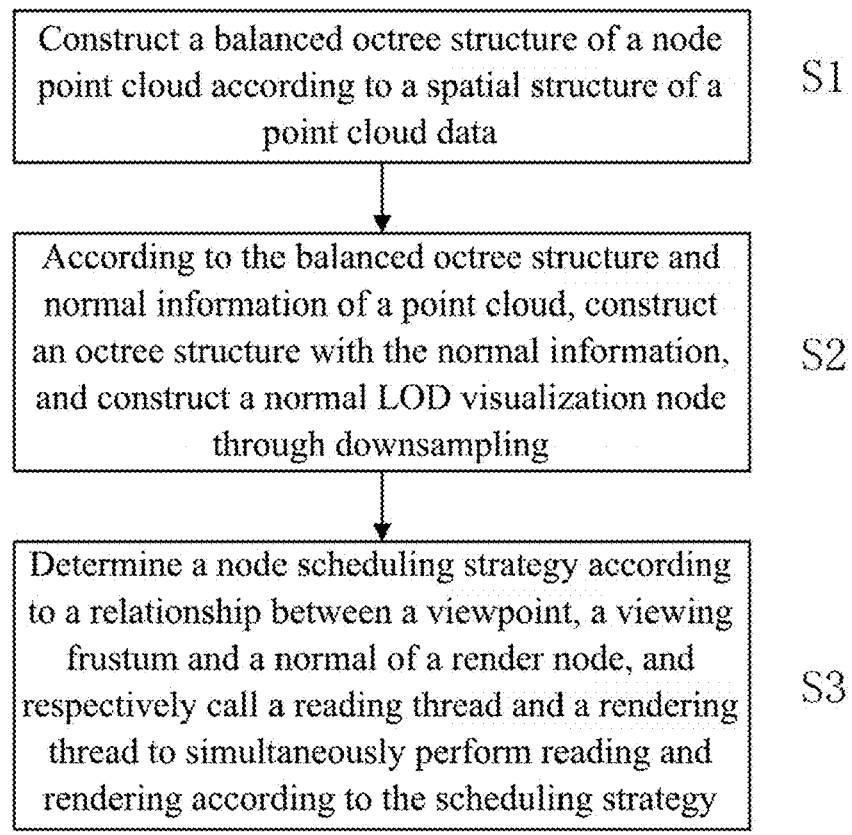
FIG. 1 is a flow chart of a method for visualizing a large-scale point cloud based on normal according to an embodiment of the present disclosure.

As shown in FIG. 1, a method for visualizing a large-scale point cloud based on normal includes the following steps.

(S1) A balanced octree structure of a node point cloud is constructed according to a spatial structure of a point cloud data.

(S101) Original point cloud data including position information and normal information are read, and a range from $P_{min}$ to $P_{max}$ of the point cloud is obtained through statistics. A bounding box is set as a root node of an octree, in which a middle point $(P_{min}+P_{max})/2$ of the range of the point cloud is taken as a center of the bounding box, and a maximum side length $H_{max}$=max $(P_{max}-P_{min})$ of the bounding box is taken as a side length of the bounding box. A level of the octree is set according the number n of points of the point cloud, in which $$L(n) = \begin{cases} 6, & n < 10'000'000 \\ 8, & n \geq 10'000'000 \end{cases}.$$

An octree structure is generated from the root node to the set level L of the octree. The point cloud data is allocated to a child node at a lowest level, that is, a node at the level L.

(S102) A threshold ε of the number of points of the child node at the lowest level is set. Balance adjustment is performed on the preprocessed octree structure, such that the number of point clouds allocated to each node is less than the threshold ε and the number of parent nodes of each node is larger than the threshold ε, so as to obtain the balanced octree structure. Specifically, the step (S102) includes the following steps.

(S102-1) All child nodes at the lowest level that have been allocated with a point cloud are marked as first nodes to be adjusted and added into a node sequence to be adjusted.

(S102-2) All node sequences to be adjusted is traversed. If the number of points of a node is greater than or equal to the threshold ε, eight nodes are generated in next level, and a point cloud of the node is allocated to the next level. The eight nodes newly generated are marked as second nodes to be adjusted and added into the node sequence to be adjusted. If the number of points of the node is less than the threshold ε, it is determined whether the total number of points of eight child nodes included in a parent node of the node is greater than the threshold ε, if the total number of points of eight child nodes included in the parent node of the node is greater than or equal to the threshold ε, the node is marked as an adjusted node; if the total number of points of eight child nodes included in the parent node of the node is less than the threshold ε, the eight child nodes are deleted and point clouds of the eight child nodes is allocated to the parent node of the node, and the parent node of the node is marked as a node to be adjusted and added into the node sequence to be adjusted.

(S102-3) If there are still nodes to be adjusted in the octree structure, the step (S102-2) is repeated until all nodes are marked as adjusted node.

(S2) According to the balanced octree structure and normal information of the point cloud, an octree structure with the normal information is constructed, and a normal level-of-detail (LOD) visualization node is constructed through downsampling.

(S201) The number of point clouds in the node $M_i$ at the lowest layer is represented as $m_i$, and the point clouds in the node is represented as $Q_j$, including position information $Q_{pj}(x_j, y_j, z_j)$ and normal information $Q_{nj}(n_{xj}, n_{yj}, n_{zj})$. A normal of the node is calculated as follows:

$$M_{ni} = \frac{1}{m_i}\sum_{j=1}^{m_i} Q_{nj}.$$

A weight of the node is $$M_{wi} = \frac{m_i}{n}.$$

(S202) All original point clouds have been allocated to the node at the child node at the lowest layer, the point cloud data of the child node is subjected to downsampling from bottom to top. A downsampled point cloud of the child node is put into a corresponding parent node at an upper level, and a normal of the parent node is calculated according to a normal and a normal weight of eight child nodes of the point cloud: $M_{pi}=\frac{1}{8}\Sigma_{i=1}^{8}M_{wi}\cdot M_{ni}$, and a weight of the node is $M_w=\Sigma_{i=1}^{8}M_{wi}$. According to such rule, all normal LOD visualization nodes are obtained through operating level by level until the root node is reached.

(S3) A node scheduling strategy is determined according to a relationship between a viewpoint, a viewing frustum and a normal of a render node, and a reading thread and a rendering thread are respectively called to simultaneously preform reading and rendering according to the scheduling strategy.

Figure 2:
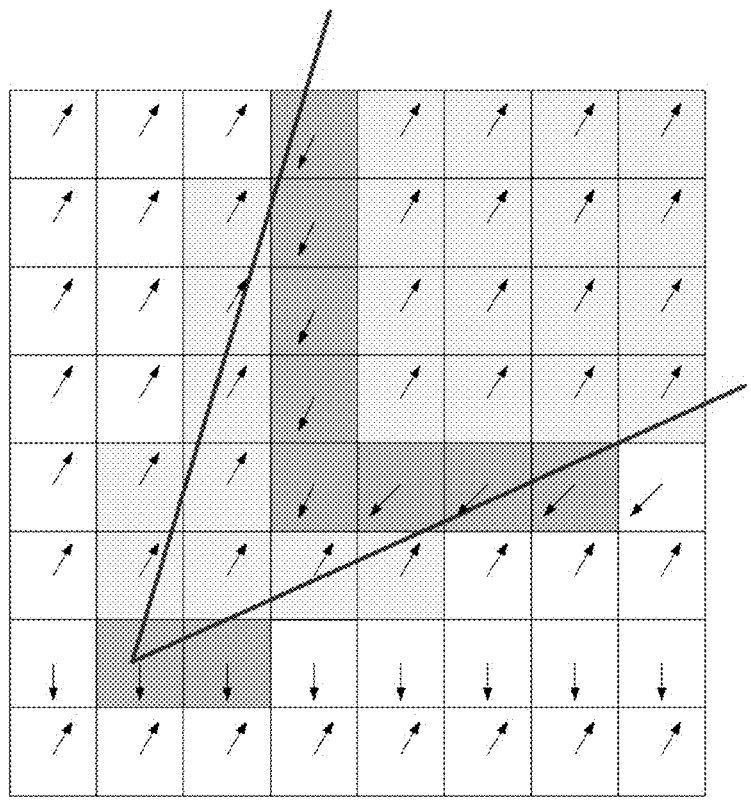
FIG. 2 schematically depicts a viewing frustum and normal-based node determination.

(S301) As shown in FIG. 2, a LOD node queue that needs to be visualized is determined according to the relationship between the viewpoint, the viewing frustum and the normal of the render node. A line-of-sight direction is defined as $\vec{s}$. The closest distance from the viewpoint to the point cloud is defined as d. Each node has a normal direction $M_{ni}$. The number of levels needed to be displayed is determined according to an equation:

$$L(d) = \begin{cases} 0, d \geq 3H_{max} \\ \left[ \dfrac{d - \dfrac{1}{3}H_{max}}{\dfrac{8}{3}H_{max}} L_{max} \right], \dfrac{1}{3}H_{max} < d < 3H_{max} \\ L_{max}, n \leq \dfrac{1}{3}H_{max} \end{cases} ;$$

where $L_{max}$ is the number of the lowest layer; $H_{max}$ is a maximum side length of the range of the point cloud. When the d is smaller, the level to be displayed is higher. The level L to be displayed is determined according to the d. If a node is within or intersected with the current frustum, the node will be displayed, and if the node is not within the current viewing frustum, the node will not be displayed. Further judgment is made according to the normal of the node. Since in a real scene, the line-of-sight direction and a surface of an object are at an obtuse angle, such a condition is set that if $\vec{s} \cdot M_{ni} < 0$, the node will be displayed; and if $\vec{s} \varepsilon M_{ni} > 0$, the node will not be displayed. In this way, the LOD node queue that needs to be visualized is determined.

(S302) After the LOD node queue that needs to be visualized is determined, the LOD node queue is read using the reading thread, and the visual LOD node queue that has been read is rendered using the rendering thread.

The embodiments mentioned above are merely preferred embodiments of the present disclosure, and not intended to limit the scope of this disclosure. Modifications and improvements made by those skilled in the art without departing from the spirit of the present disclosure should fall within the scope of the present disclosure defined by the appended claims.

What is claimed is:

1. A method for visualizing a large-scale point cloud based on normal, the method comprising:
   (S1) according to a spatial structure of a point cloud data, constructing a balanced octree structure of a node point cloud;
   (S101) setting a maximum bounding box as a root node of an octree according to a range of a point cloud; setting a level of the octree according to the number of points of the point cloud; generating an octree structure from the root node to a set level; and allocating the point cloud data to a child node at a lowest level; and
   (S102) setting a threshold ε of the number of points of the child node at the lowest level; and performing balance adjustment on the octree, such that the number of point clouds allocated to each node is less than the threshold ε and the number of parent nodes of each node is larger than the threshold ε;
   (S2) according to the balanced octree structure and normal information of the point cloud, constructing an octree structure with the normal information; and constructing a normal level-of-detail (LOD) visualization node through downsampling;
   (S201) calculating an average normal of all points of a child node at the lowest level as a normal of the node; and taking a ratio of the number of points of the node to the number of all points of the point cloud as a normal weight of the node; and
   (S202) downsampling point cloud data of the child node from bottom to top; putting a downsampled point cloud of the child node into a corresponding parent node at an upper level; calculating a normal and a normal weight of the parent node according to a normal and a normal weight of the child node; according to such rule, operating level by level until the root node is reached to obtain all normal LOD visualization nodes; and
   (S3) determining a node scheduling strategy according to a relationship between a viewpoint, a viewing frustum and a normal of a render node; and respectively calling a reading thread and a rendering thread to simultaneously perform reading and rendering according to the scheduling strategy.

2. The method of claim 1, wherein the step (S102) is performed through steps of:
   (S102-1) marking all child nodes at the lowest level that have been allocated with a point cloud as first nodes to be adjusted; and adding the nodes to be adjusted into a node sequence to be adjusted;
   (S102-2) traversing all node sequences to be adjusted, if the number of points of a node is greater than or equal to the threshold ε of the number of point, generating eight nodes in next level, allocating a point cloud of the node to the next level, marking the eight nodes newly generated as second nodes to be adjusted, and adding the second nodes to be adjusted into the node sequence to be adjusted; and if the number of points of the node is less than the threshold ε, determining whether the total number of points of eight child nodes included in a parent node of the node is greater than the threshold ε, if the total number of points of eight child nodes included in the parent node of the node is greater than or equal to the threshold ε, marking the node as an adjusted node; if the total number of points of eight child nodes included in the parent node of the node is less than the threshold ε, deleting the eight child nodes and allocating the point cloud of the eight child nodes to the parent node of the node, marking the parent node of the node as a node to be adjusted followed by adding into the node sequence to be adjusted; and
   (S102-3) if there are still nodes to be adjusted in the octree structure, repeating the step (S102-2) until all nodes are marked as adjusted node.

3. The method of claim 1, wherein the step (S3) is performed through steps of:
   (S301) determining a LOD node queue that needs to be visualized according to the relationship between the viewpoint, the viewing frustum and the normal of the render node; and
   (S302) reading the LOD node queue using the reading thread followed by rendering using the rendering thread.

4. The method of claim 2, wherein the step (S3) is performed through steps of:

(S301) determining a LOD node queue that needs to be visualized according to the relationship between the viewpoint, the viewing frustum and the normal of the render node; and (S302) reading the LOD node queue using the reading thread followed by rendering using the rendering thread.

5. The method of claim 3, wherein the step (S301) is performed through steps of:

defining a line-of-sight direction as $\vec{s}$ and a closest distance from the viewpoint to the point cloud as d, and defining that each node has a normal $M_{ni}$; determining the number of levels needed to be displayed according to the d; determining a node to be displayed at the level to be displayed according to the viewing frustum; and determining the LOD node queue that needs to be visualized according to $\vec{s} \cdot M_{ni} < 0$.

6. The method of claim 4, wherein the step (S301) is performed through steps of:

defining a line-of-sight direction as $\vec{s}$ and a closest distance from the viewpoint to the point cloud as d, and defining that each node has a normal direction $M_{ni}$; determining the number of levels needed to be displayed according to the d; determining a node to be displayed at the level to be displayed according to the viewing frustum; and determining the LOD node queue that needs to be visualized according to $\vec{s} \cdot M_{ni} < 0$.

* * * * *